US009724893B2

(12) United States Patent
Pribanic

(10) Patent No.: US 9,724,893 B2
(45) Date of Patent: Aug. 8, 2017

(54) OUT-OF-AUTOCLAVE CURING SYSTEM

(71) Applicant: THE FLORIDA INTERNATIONAL UNIVERSITY BOARD OF TRUSTEES, Miami, FL (US)

(72) Inventor: Tomas A. Pribanic, Doral, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 414 days.

(21) Appl. No.: 14/170,503

(22) Filed: Jan. 31, 2014

(65) Prior Publication Data

US 2014/0220839 A1    Aug. 7, 2014

Related U.S. Application Data

(60) Provisional application No. 61/760,563, filed on Feb. 4, 2013.

(51) Int. Cl.
| | |
|---|---|
| B32B 7/12 | (2006.01) |
| B32B 37/12 | (2006.01) |
| C09J 5/00 | (2006.01) |
| B32B 5/02 | (2006.01) |
| B32B 5/24 | (2006.01) |
| B29C 35/02 | (2006.01) |
| B29C 35/08 | (2006.01) |

(52) U.S. Cl.
CPC ............ B32B 7/12 (2013.01); B32B 5/028 (2013.01); B32B 5/24 (2013.01); B32B 37/1207 (2013.01); C09J 5/00 (2013.01); B29C 35/0272 (2013.01); B29C 2035/0827 (2013.01); B32B 2262/101 (2013.01); B32B 2262/105 (2013.01); B32B 2307/40 (2013.01); B32B 2310/0831 (2013.01); C09J 2205/31 (2013.01); Y10T 428/249924 (2015.04); Y10T 428/31504 (2015.04); Y10T 442/10 (2015.04)

(58) Field of Classification Search
CPC ............... B32B 2110/0831; B32B 7/12; B32B 37/1207; B32B 5/028; B32B 5/24; B29C 2035/0827; C09J 2205/31; Y10T 442/10
See application file for complete search history.

(56) References Cited

U.S. PATENT DOCUMENTS

| | | | | | |
|---|---|---|---|---|---|
| 4,234,907 | A | * | 11/1980 | Daniel ................. | A41D 27/085 139/420 R |
| 4,761,047 | A | * | 8/1988 | Mori .................... | A61N 5/0616 36/137 |
| 2004/0021255 | A1 | * | 2/2004 | Bilanin ............... | B29C 35/0272 264/494 |

* cited by examiner

*Primary Examiner* — Daniel McNally
(74) *Attorney, Agent, or Firm* — Marshall, Gerstein & Borun LLP

(57) ABSTRACT

A method for bonding two parts together in accordance with an embodiment of the disclosure can include providing first and second parts, placing a light curable adhesive between the first and second parts, and irradiating the light curable adhesive using a modified fiber optic filament disposed between the first and second parts.

8 Claims, 4 Drawing Sheets

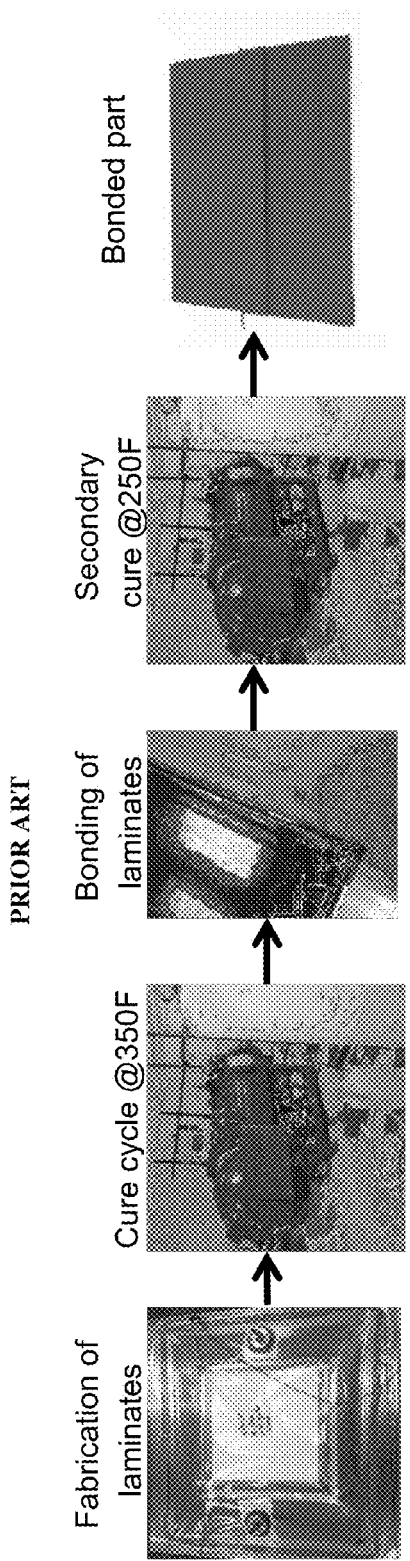
FIG 1. Typical sequence of a prior art bonded part
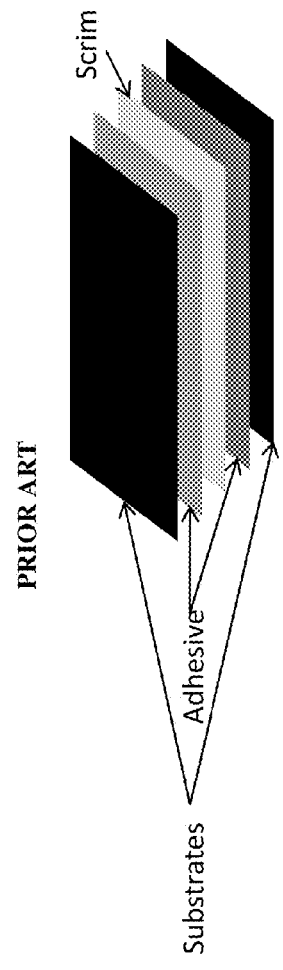
FIG 2. Configuration of a typical composite bond

PRIOR ART
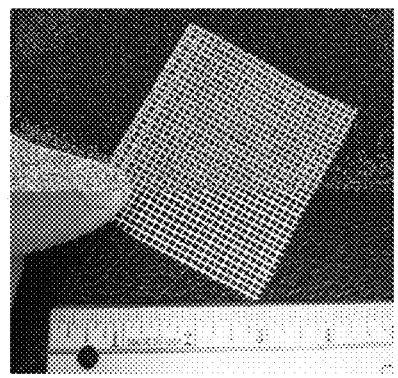
FIG 3. Prior art scrim for controlling bondline thickness
FIG 4. UV light source directed into the bond area inside the part
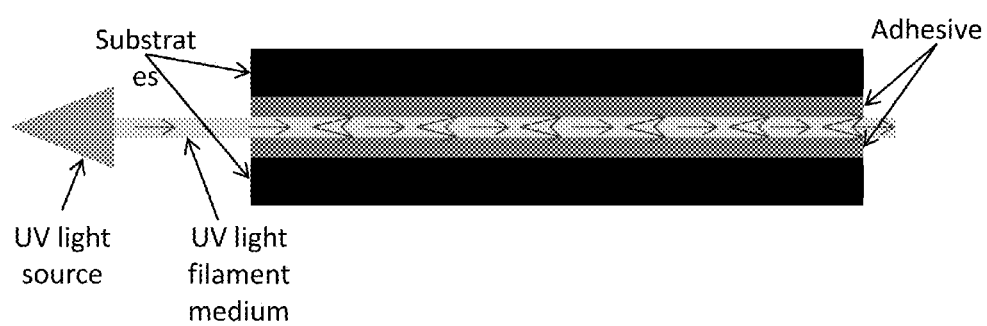
FIG 5A. Cross-sectional area showing UV light radiated to the adhesive

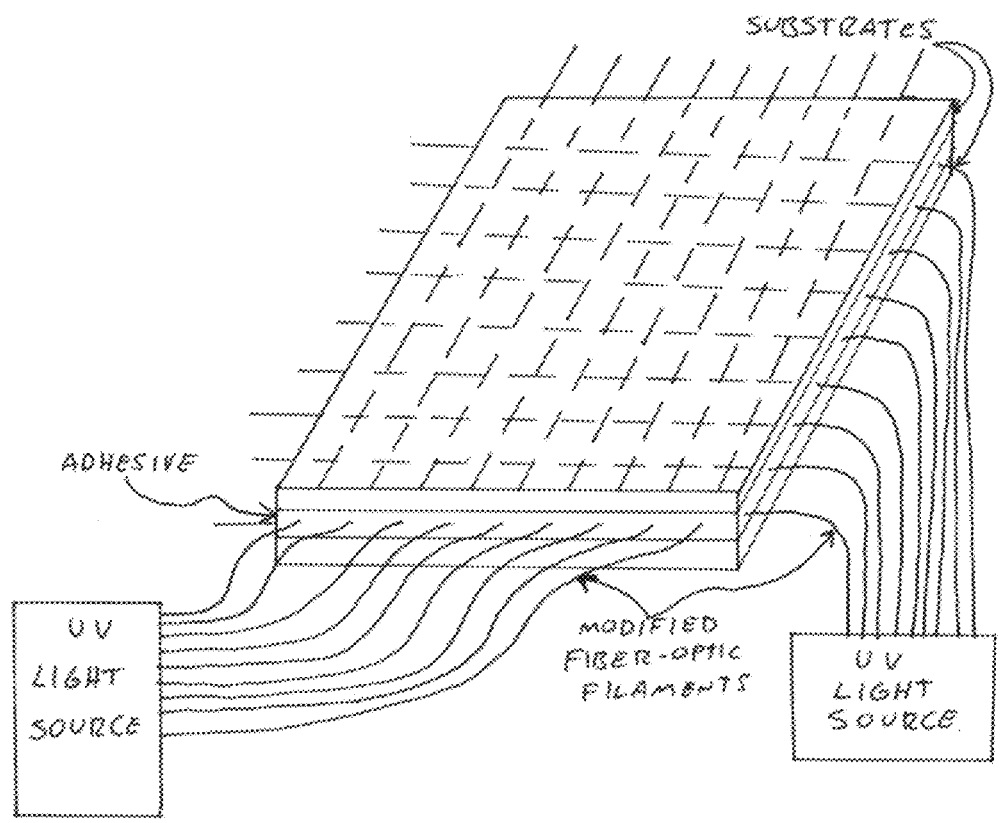
Fig. 5B
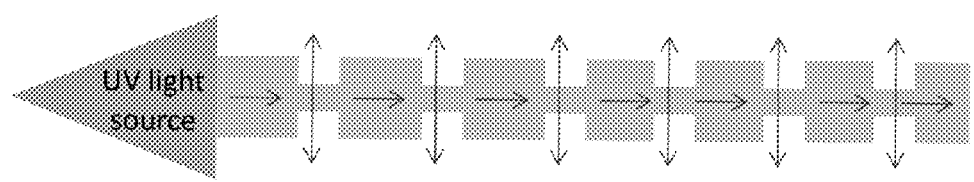
FIG 6. Modified fiber-optic filament

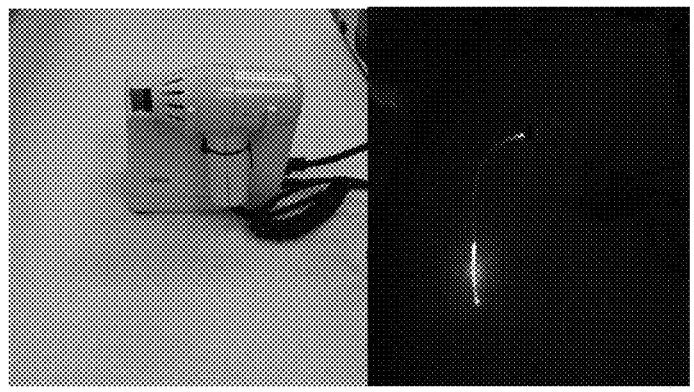
FIG 7.Test conducted using a 50W UV light source and modified fiber optic filament

OUT-OF-AUTOCLAVE CURING SYSTEM

CROSS-REFERENCE TO RELATED APPLICATION

The benefit under 35 U.S.C. §119(e) of U.S. Provisional Patent Application No. 61/760,563 filed Feb. 4, 2013, is hereby claimed, and the disclosure is incorporated herein by reference.

BACKGROUND

Secondary curing is a common manufacturing process used to bond composite parts. The laminates (substrates) are first fabricated and then bonded together using an adhesive with the use of a high pressure high temperature autoclave. FIG. 1 shows a typical sequence for the fabrication of a composite bonded part using an autoclave which includes the steps of the fabrication of the laminates, the first cure cycle, the bonding of the laminates, the secondary cure cycle and finishing with the bonded part. FIG. 2 shows the configuration of a substrate, adhesive and scrim prior to being bonded together using an autoclave. FIG. 3 shows a commercially available scrim used in composite bonding.

Though adhesively bonded parts exhibit many advantages such as lighter weight over mechanically fastened parts, the autoclave process is expensive and causes degradation of the mechanical properties and shape of the laminates. When laminates such as carbon fiber laminates are re-heated during secondary curing, their mechanical properties can be degraded and also the process requires molds and tools to prevent deformation of the original shape of the part which adds additional cost and time to the overall process. Moreover, after the part is bonded, there is the potential of internal stress cracks resulting from thermal stresses created during the bonding process.

BRIEF DESCRIPTION OF DRAWINGS

FIG. 1 shows a typical sequence for a prior art autoclave bonding of two laminates.

FIG. 2 shows a prior art configuration for a composite bond.

FIG. 3 shows a prior art scrim used for controlling bondline thickness.

FIG. 4 shows how UV light is provided to a part to be bonded in accordance with an embodiment of the disclosure.

FIG. 5A shows a cross-sectional view of how UV light is presented between two substrates using a modified fiber optic fiber in accordance with an embodiment of the disclosure.

FIG. 5B shows an isometric view of bonding of two substrates using a modified fiber optic fiber in accordance with an embodiment of the disclosure.

FIG. 6 shows a modified fiber-optic filament showing a plurality of cuts along the length of the filament in accordance with an embodiment of the disclosure.

FIG. 7 shows a test conducted using a modified fiber optic filament and a UV light source in accordance with an embodiment of the disclosure.

DETAILED DESCRIPTION

In one embodiment of the disclosure, an out-of-autoclave method that does not require the use of an autoclave to bond laminates, such as composite laminates, and eliminates having to subject the laminates to a re-heating process during bonding is described. In a first embodiment, an adhesive film such as a structural adhesive film that cures when exposed to ultraviolet (UV) light is used. Within the film, there are provided modified fiber-optic filaments that carry the light form a UV source outside the parts that are to be bonded to the adhesive bonding area between the parts. This system allows for curing resin of long and thick parts with complex shapes without the use of molds regardless of the molds length and thickness.

Unlike regular fiber optic filaments, the modified fiber-optic filaments of the disclosure allow for the UV light provided by the UV light source to spread across the bonding area and activate the adhesive. The modified fiber optic filaments are modified in one embodiment by cutting into the fiber optic filaments, for example, using a razor or other sharp object, without completely severing the cross-section of the fiber optic filaments. The cut of the fiber optic filaments can be done all around the circumference of the filament or to portions of the circumference. FIG. 6 shows one modified fiber optic filament in accordance with an embodiment of the disclosure. These one or more cuts to the fiber optic filament are done along the length of the fiber optic filament and can be spaced apart depending on the particular amount of UV that is required to "bleed out" or escape from the filament. The cuts to the fiber-optic filaments can be done in a number of ways, for example using a cutting machine that cuts portions of the fiber-optic filaments along their length while the fiber-optic is passed through the machine. If smaller volumes of fiber-optic filaments are required, the fiber-optic filaments can be cut by hand using a circular cutting tool. In another embodiment, the modified fiber-optic filament or mesh can be designed with light radiating portions already built-in. The light radiating portions being distributed preferable so that the light that is radiated (emitted) from the fiber-optic filament or mesh covers the area to be adhesively cured.

A scrim is conventionally used to control the bond-line thickness on bonded composites, and adhesive films are sold with and without a supported scrim already attached to them. In an embodiment, the common plastic scrim, for example as illustrated in FIG. 3, can be replaced with a mesh that is made out of modified fiber optic filaments, like fiber optic filament 614. The filaments that form the mesh can run continuously along the bondline and protrude to the outside of the part where they are coupled to a UV light source or multiple UV light sources (e.g., one on the X-axis and one on the Y-axis). The UV light travels from the UV light source(s) to inside the part as shown on FIG. 4 and the UV light is dispersed by the modified fiber optic filaments to the UV curable adhesive. The UV light causes the adhesive to bond the two substrates together.

FIG. 5A shows a cross-sectional area of the part during the bonding process of an embodiment of the disclosure. FIG. 5B shows an isometric view of a part during the bonding process in accordance with an embodiment of the disclosure. UV light is irradiated to the top and bottom adhesive layers from outside the part using a fiber optic filament as a medium. To promote the radiation of the UV light to the sides of the filament, cuts to the surface of the filament are made to modify the filament(s) as shown in FIG. 6. FIG. 7 shows a preliminary test conducted using a 50 W UV light source and a 1 mm diameter modified fiber-optic filament in accordance with an embodiment of the disclosure showing how the UV light is dispersed outside of the fiber-optic filament.

It should be noted that instead of using adhesive films as shown in FIG. 5, the adhesive can be of the type that is applied to the substrates, and the adhesive can be applied to the substrates using any known methods. In another embodiment, instead of or in addition to using a modified fiber optic mesh, individual modified fiber optic members can be placed between the two substrates that are to be bonded. In still another embodiment, instead of using a single UV light source to cure the adhesive, multiple UV light sources can be coupled to the protruding modified fiber optic fiber members or mesh depending on the particular bonding and amount of UV light that is required to cure the adhesive. The coupling of the UV light source is can be accomplished by presenting the ends of the modified fiber optic filaments substantially in parallel to the UV light source so that the UV light runs along the length of the modified fiber optic members and bleeds out through the cuts along the lengths of the filaments. Although UV light is used in the described embodiments, any type of light curable adhesives is contemplated as within the scope of the disclosure, and any form of adhesive, including for example, film form or non-film form, such as adhesives that are applied to a substrate (e.g., brushed or sprayed on).

The thickness of the substrates that need to be bonded, the thickness of the adhesive that needs to be applied between the substrates, and the thickness of the modified fiber optic scrim or individual fiber optic fibers used can be tailored to the particular application at hand. In one embodiment, the modified fiber optic scrim or mesh can be approximately 0.005 inch thick and a thickness for a fiber optic filament can be approximately 0.059 inch thick. Other suitable thicknesses are contemplated herein. Light cure adhesive can be applied to different thickness depending on the substrates that require bonding. The composition and/or form of light cure adhesive that could be used can depend on the particular substrates that are to be bonded and their composition.

What is claimed:

1. A method for bonding two parts together, comprising:
    providing first and second parts;
    placing a light curable adhesive between the first and second parts;
    placing a mesh of modified fiber optic filaments between the first and second parts such that the light curable adhesive is disposed above and below the mesh of modified fiber optic filaments, wherein the modified fiber optic filaments extends outwardly from the first and second parts in at least two directions and the modified fiber optic filaments each comprises a plurality of cuts disposed along the length of the modified fiber optic filament, each cut extending around the entire circumference of the modified fiber optic filament, but not severing the entire cross-section of the modified fiber optic filament; and
    irradiating the light curable adhesive by exposing the extensions of the modified fiber optic filaments to radiation, wherein the mesh of modified fiber optic elements is exposed to the radiation in the at least two directions, and the radiation extends through each of the plurality of cuts such that the light curable adhesive both above and below the mesh of modified fiber optic elements is exposed to radiation extending through each cut.

2. The method as defined in claim 1, wherein the light curable adhesive comprises UV curable adhesive and is the adhesive is irradiated using UV light.

3. The method as defined in claim 1, wherein the adhesive is an adhesive film and the mesh of modified fiber optic filaments is coupled to the adhesive film.

4. The method as defined in claim 1, further comprising:
    providing a light source in optical communication with the part of the fiber optic mesh that extends beyond the border of the first and second parts such that the part of the fiber optic mesh that extends beyond the border is substantially parallel to the light source.

5. The method as defined in claim 1, comprising irradiating the light curable adhesive using a light source directly coupled to the mesh of modified fiber optic filaments.

6. The method as defined in claim 1, wherein the light curable adhesive is an adhesive film disposed between the first and second parts.

7. A method for bonding two parts, comprising:
    providing a light curable adhesive and a mesh of modified fiber optic filaments between first and second parts, wherein the mesh of modified fiber optic filaments is in proximity to the adhesive and the mesh of fiber optic filaments consists of modified fiber optic filaments that extend in at least two directions, wherein each modified fiber optic filament comprises a plurality of cuts disposed along the length of the modified fiber optic filament and each cut extends around the entire circumferences of the modified fiber optic filament but does not severe entirely through the cross-section of the modified fiber optic fiber;
    exposing the fiber optic filaments to a light source to thereby irradiate the light curable adhesive, wherein light from the light source extends out of each of the cuts around the entire circumference of the respective modified fiber optic filament.

8. A method for bonding two parts, comprising:
    providing a film of adhesive supported by a mesh of modified fiber optic filaments between first and second parts, wherein the mesh of modified fiber optic filaments comprises filaments arranged to run continuously along the bondline between the first and second parts and protrude to the outside of the part in at least two directions, wherein each modified fiber optic filament comprises a plurality of cuts disposed along the length of the modified fiber optic filament and each cut extends around the entire circumferences of the modified fiber optic filament but does not severe entirely through the cross-section of the modified fiber optic fiber;
    exposing the mesh of modified fiber optic filaments to a light source to thereby irradiate the light curable adhesive, wherein light from the light source extends out of each of the cuts around the entire circumference of the respective modified fiber optic filament.

* * * * *

UNITED STATES PATENT AND TRADEMARK OFFICE
CERTIFICATE OF CORRECTION

| | | |
|---|---|---|
| PATENT NO. | : 9,724,893 B2 | Page 1 of 1 |
| APPLICATION NO. | : 14/170503 | |
| DATED | : August 8, 2017 | |
| INVENTOR(S) | : Tomas A. Pribanic | |

It is certified that error appears in the above-identified patent and that said Letters Patent is hereby corrected as shown below:

In the Claims

At Column 4, Line 5, "and is the" should be -- and the --.

Signed and Sealed this
Third Day of April, 2018

Andrei Iancu
*Director of the United States Patent and Trademark Office*